S. SHAFER, Jr.
VALVE DEVICE.
APPLICATION FILED FEB. 27, 1917.
1,317,762.
Patented Oct. 7, 1919.
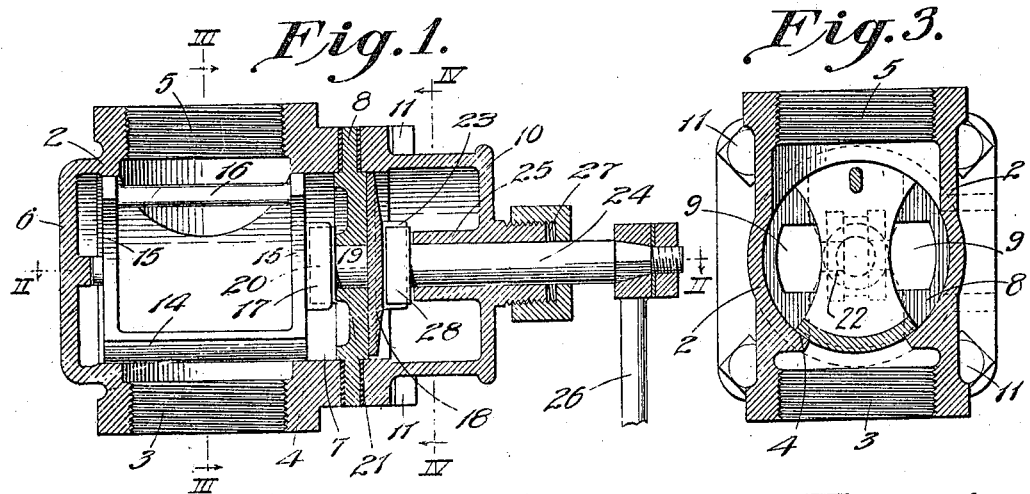
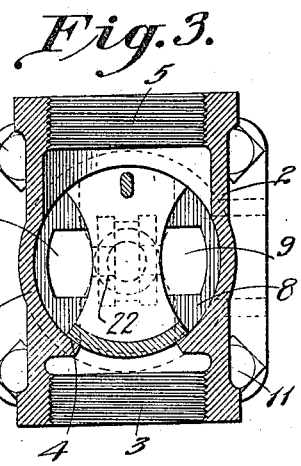
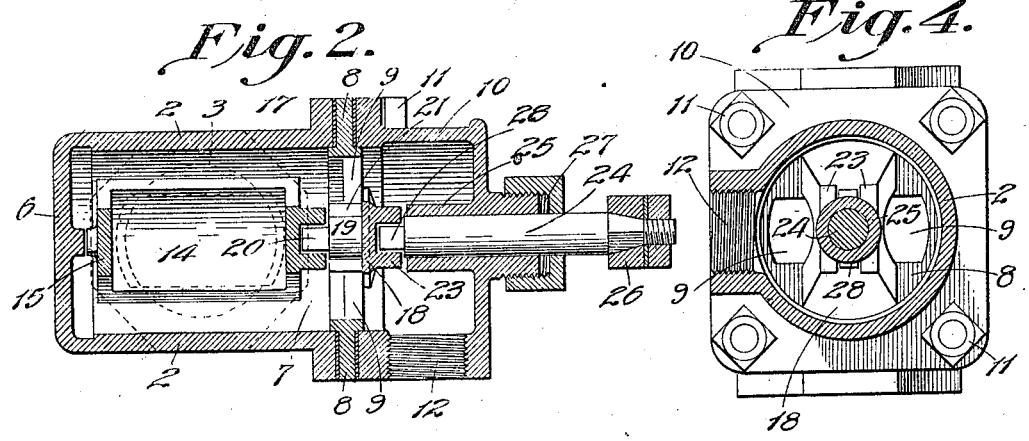
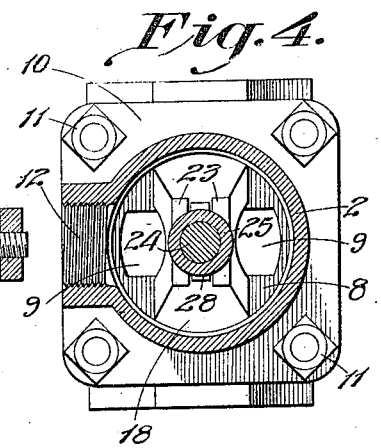
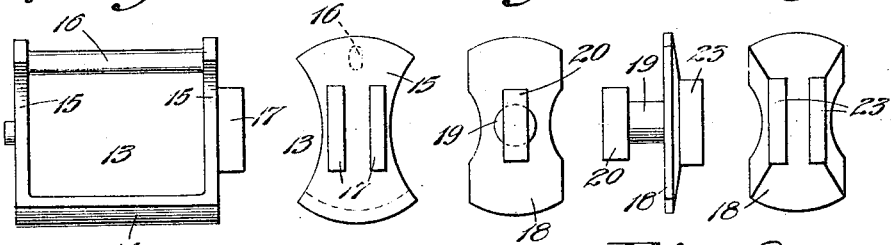
Inventor
Samuel Shafer Jr
By John S. Barker
his Attorney

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN.

VALVE DEVICE.

1,317,762.  Specification of Letters Patent.  Patented Oct. 7, 1919.

Application filed February 27, 1917. Serial No. 151,272.

*To all whom it may concern:*

Be it known that I, SAMUEL SHAFER, Jr., a citizen of the United States, residing at Milwaukee, in the county of Milwaukee and State of Wisconsin, have invented certain new and useful Improvements in Valve Devices, of which the following is a specification.

My invention relates to valve devices intended to be used for controlling the flow of water or other liquids, having novel features and characteristics that I will later point out in this specification.

In the accompanying drawings illustrating an embodiment of my invention, Figure 1 is a central vertical section of the valve device.

Fig. 2 is a horizontal section taken on the line II—II of Fig. 1.

Fig. 3 is a transverse sectional view taken on the line III—III of Fig. 1.

Fig. 4 is a transverse sectional view on the line IV—IV of Fig. 1.

Figs. 5, 6, and 7, are detail views illustrating the valve controlling the outflow, and Figs. 8 and 9 are detail views illustrating another valve controlling the inflow of the liquid.

Referring to the drawings, 2 indicates the main valve casing. It is formed with an outlet opening 3, screw-threaded or otherwise provided for the attachment of a pipe, or coupling, not shown, and with another opening 5, preferably arranged opposite the opening 3, with which a pipe may be connected. Adjacent to the opening 3, the casing is fitted to form a curved valve seat 4. One end, 6, of the valve casing is closed, while in the opposite end is formed an opening 7. It is through this latter opening that access is had to the interior of the valve casing, and through it is inserted the main valve 13. The open end of the casing is closed by a grid plate 8 in which are formed openings or ports 9, preferably two, disposed diametrically opposite each other. Covering the grid plate is an inlet cap 10 that is secured to the main casing by bolts 11, passing through flanges or marginal portions of the inlet cap, the grid plate, and main casing. Between the parts thus united are arranged suitable packing gaskets to prevent leakage. The main valve 13, that is the one that controls the port to the delivery opening 3, is preferably a rotary valve with a curved plate, 14, that is a segment of a cylinder, adapted to fit the seat 4 and against the inner face of which the fluid controlled by it acts; and as this valve has many of the characteristic features of what is commonly known as a cylindrical valve, I shall so designate it herein and I shall refer to it specifically as a hollow cylindrical valve, since the fluid controlled by it acts from the inside thereof outwardly, holding it to its seat 4. The valve 13 further comprises the end pieces 15 and cross-connecting piece 16 uniting the end pieces and disposed diametrically opposite the plate 14, and serving to strengthen the valve. One of the end pieces 15, the one that is arranged toward the end of the casing in which is the opening 7, is provided with a pair of lugs 17, spaced apart as indicated in Fig. 6.

By reference to the drawings it will be seen that when the valve 13 is in the position there indicated, it completely closes the port to the outlet opening, but that a quarter revolution of the valve uncovers said port and puts the outlet pipe into free communication with the interior of the casing 2.

I provide a second valve, arranged when in one position to cover the openings 9 through the grid plate, and thus cut off communication between the main casing and the inlet cap, or, when turned, to uncover the said openings, putting these two parts of the valve device into free communication, and I connect the two valves so that they are operated in unison.

18 indicates a disk valve working against the face of the grid plate that is toward the inlet cap. It is shaped so that when adjusted to the position represented in Fig. 4, it uncovers the openings 9 through the grid plate, and when given a quarter turn, it overlies them. This valve is supported by a short spindle 19, that is adapted to be seated in a bearing 21, formed therefor in the grid plate 8. The inner end of the spindle 19 is provided with a crosshead 20 that is adapted to lie between the lugs 17 of the main valve 13. There is an opening 22 through the bearing 21 located between the ports 9—9 in the grid plate in order to permit the crosshead to pass through the plate and into working engagement with the main valve 13, and bringing the valve 18 against the face of the grid plate 8. The valve 18, as will be seen by reference to the drawings, is formed to have a pair of wings similarly disposed on diametrically opposite sides of the axis of rotation of the valve and arranged to cover the two openings 9, which are both of the same size and are similarly located with reference to the said axis of the valve. This arrangement has been adopted to insure that the valve shall be balanced when under pressure of the water entering the valve through the inlet pipe and preventing it from canting, as would be the case were only a single opening 9 employed. The valve 18 is provided on its outer face with a pair of lugs 23, spaced apart, and between which a crosshead 28, carried by the valve-operating stem 24, is adapted to lie. The valve stem 24 is mounted in a bearing 25 and may carry an operating handle 26. A gland 27 at the outer end of the bearing packs the stem and prevents leakage. The connection just described between the valves 13 and 18 permits them to move independently one of the other to a limited extent so that each may be held closely to its seat, one, the valve 18 being movable parallel with the line of the axis of rotation of the valves, while the valve 13 is movable radially to such line.

12 indicates the opening into the casing 10 where the inlet pipe is connected.

The valve device which I have described is adapted to be used in connection with a tank or other receptacle for holding a determined amount of liquid, connected with the main casing through the opening 5. Such receptacle is periodically filled and discharged upon the valves being properly manipulated, and thus definite, measured quantities of liquid may be delivered through the opening 3 as desired.

The parts of the valve device being arranged and connected as described, its operation is as follows: In Figs. 1, 2, and 3, I indicate the positions of the parts while the tank or receptacle connected with the casing is being filled. As represented, the valve 18 lies between the openings 9 in the grid plate, uncovering them, and the valve 13 closes the port to the outlet opening 3. There is, therefore, free flow from the inlet opening 12 through the chambers of the inlet cap and of the main valve casing to the measuring, or temporarily storing, receptacle. When the desired amount of liquid has passed the valve device, the stem 24, and the two valves it controls are turned a quarter revolution, the valve 18 closing the openings 9, and the valve 13 uncovering the port to the discharge opening 3.

With a valve device the parts of which are arranged as described and illustrated, it is apparent that when the valve 13 is seated, closing the discharge, it is held to its seat by the pressure of the water, either the pressure of the main supply entering at the opening 12, or that of the liquid temporarily stored in the storage receptacle. And it will also be seen that when the parts are adjusted for discharge, the valve 18 is held firmly against its seat by the pressure of the liquid entering from the source of supply through the opening 12. Thus both valves, 13 and 18, are, by fluid pressure, always held tightly against their seats when occupying closing positions, and this is permitted, even though the valves and their seats may become worn to a considerable extent, by reason of the loose, operating connections that I employ between the valves.

The two valves, while turning about the same axis of rotation, have their operating faces disposed so that one, the disk valve 18, moves in a plane that cuts the axis of rotation at right angles, while the other, that of the discharge valve 13, moves in a path concentric with the axis of revolution.

What I claim is:

1. In a valve device, the combination of a casing adapted to receive a rotary cylindrical valve, and having an outlet port controlled by the said valve, and an opening adapted to be in free communication with a liquid storage receptacle, one end of the casing being open to permit the insertion and removal of the valve, a cylindrical valve working in the said casing, a plate covering the said open end of the valve casing, having through it an inlet port, a disk valve seated against the said plate and arranged to control the inlet port, an inlet cap having a chamber in which the disk valve is situated, and means for connecting the valves so that they are caused to turn simultaneously, the valves being disposed so that when one port is covered, the other is opened, and vice versa.

2. In a valve device, the combination of a casing having a curved valve seat and a port adjacent thereto and an opening through which the valve casing may be in free communication with a liquid receptacle that is to be alternately filled and discharged, one end of the casing being open, a rotary valve fitted to the said curved seat and adapted to be inserted into the casing through the open end, a plate for closing the open end of the casing, having through it an inlet port, a cap covering the plate and provided with an opening through which liquid may be supplied under pressure, a disk valve adapted to open and close the inlet port through the plate, the disk valve being provided with a spindle mounted in the plate, means carried by the said spindle for loosely engaging with the rotary cylindrical valve causing the valves to be simultaneously rotated, and means for turning the disk valve, the valves being so disposed that when the port controlled by one is uncovered that controlled by the other is covered, and vice versa.

3. In a valve device the combination of a casing adapted to receive a rotary cylindrical valve and having an outlet port controlled thereby, one end of the casing being open to permit the insertion and removal of the valve, a cylindrical valve working in the said casing, a removable plate for covering the open end of the valve casing, having through it an inlet port, an inlet cap shaped to form a chamber covering the said plate, and secured to the valve casing, a valve stem supported in the cap, and a disk valve controlling the port in the said covering plate, located in line between the valve stem and the cylindrical valve and loosely connected with each, whereby the valves are independently movable to accurately seat themselves and may be simultaneously operated by the manipulation of the valve stem.

4. In a valve device, a casing formed of a main portion having two outlet connections and a chambered cap having an inlet connection, the chambers in the two parts being in line with each other and there being free communication between the said parts from one to the other, a ported plate located between the said parts of the valve casing and held in place when the parts are united, a rotary cylindrical valve located in the chamber of the main part of the valve casing controlling one of the outlet openings thereof, a disk valve supported by the ported plate between the parts of the valve casing controlling the port in the said plate, and loosely connected with the cylindrical valve so the two turn together and are yet free to move independently to accurately fit their respective seats, and a valve stem supported in the inlet cap part of the valve casing and engaging loosely with the disk valve for turning it.

5. In a valve device, a casing formed of a main portion having outlet connections and a separable chambered portion having an inlet connection, a plate located between the said parts of the valve formed with a pair of similar ports communicating with the chambers in the two parts of the valve, a rotary cylindrical valve located in the chamber in the main part of the valve casing controlling one of the outlet openings, a disk valve bearing against the plate separating the chambers of the valve, and rotatable about an axis located midway between the ports in the said plate, the disk valve having two wings on opposite sides of its axis of rotation adapted to cover the said ports, this valve being thus balanced when held to its seat by pressure of water in the inlet chamber, and a loose connection between the cylindrical valve and the disk valve by which the two are caused to turn together and are yet free to move independently so they may accurately fit their respective seats.

SAMUEL SHAFER, Jr.

Copies of this patent may be obtained for five cents each, by addressing the "Commissioner of Patents, Washington, D. C."